S. A. SMITH.
Milking-Tube.

No. 163,816.

Patented May 25, 1875.

UNITED STATES PATENT OFFICE.

SYLVESTER A. SMITH, OF MUSCATINE COUNTY, IOWA.

IMPROVEMENT IN MILKING-TUBES.

Specification forming part of Letters Patent No. 163,816, dated May 25, 1875; application filed April 27, 1875.

*To all whom it may concern:*

Be it known that I, SYLVESTER A. SMITH, of Muscatine county, State of Iowa, have invented a new and Improved Milking-Tube; and I do hereby declare that the following is a full, clear, and exact description of the same, reference being had to the accompanying drawing, forming a part of this specification, in which—

Figure 1:
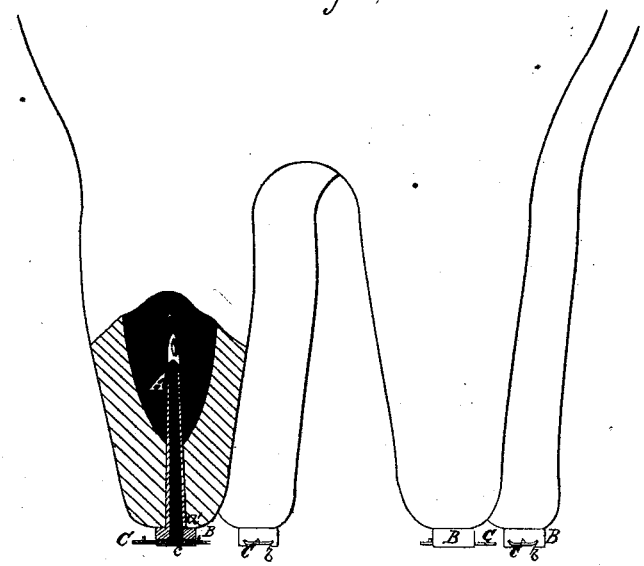
Figure 2:
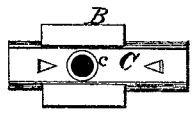

Figure 1 is a vertical sectional elevation; Fig. 2, a bottom view.

The invention contemplates a new mode of extracting milk from the udders of a cow or other animal, by inserting into each teat a tube, open at the upper but valve-closed at the lower end.

A represents a tube, tapering to a minimum at the open end $a$, and provided on the large end $a'$ with a head, B. The latter has a dovetailed groove, $b$, in which is moved a slide-valve, C, having the aperture $c$. This is the form of opening and closing slide-valve which I preferably use, but any other of convenient shape and adjustability may be employed without departing from the principle of my invention.

I push the small open end of a tube into each teat to the extent of about one inch, when the milk will percolate into and fill the tube. The pail is then placed beneath the teats and the valves slid until the aperture $c$ registers or coincides with that of tube, when the milk will continue to flow until all is drawn from the udder.

These tubes are found in practice not at all to hurt or annoy the animal, while they operate with wonderful efficiency in extracting the whole quantity of milk that has been secreted.

I am aware that a teat-compressor, a tube, and a piston have been heretofore combined for milking purposes; but

What I claim is—

As an article of manufacture, the milking-tube A, having grooved head B and slide-valve C, arranged substantially as and for the purpose specified.

SYLVESTER A. SMITH.

Witnesses:
SYLVESTER SMITH,
MARY SMITH.